Feb. 6, 1951        D. ROEDER ET AL        2,540,458
TRACTOR CONTROL PEDAL ARRANGEMENT
Filed Sept. 19, 1947
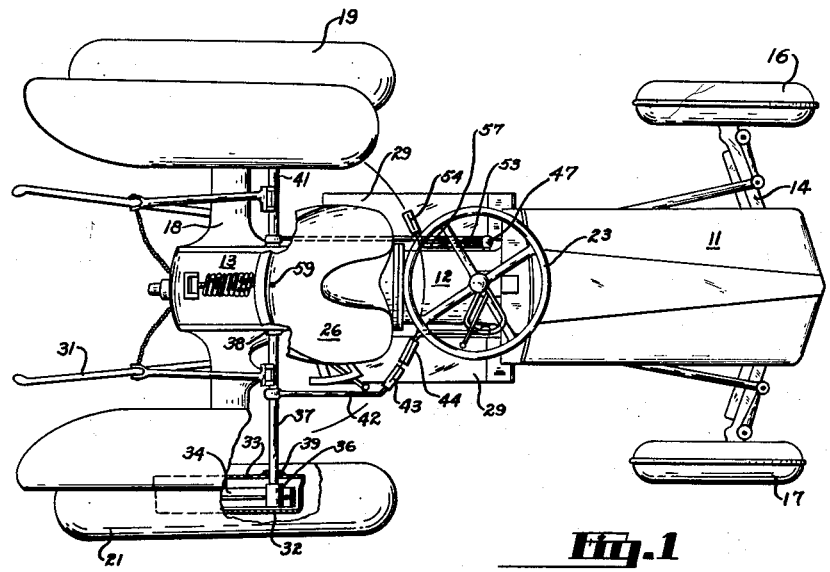
Fig. 1
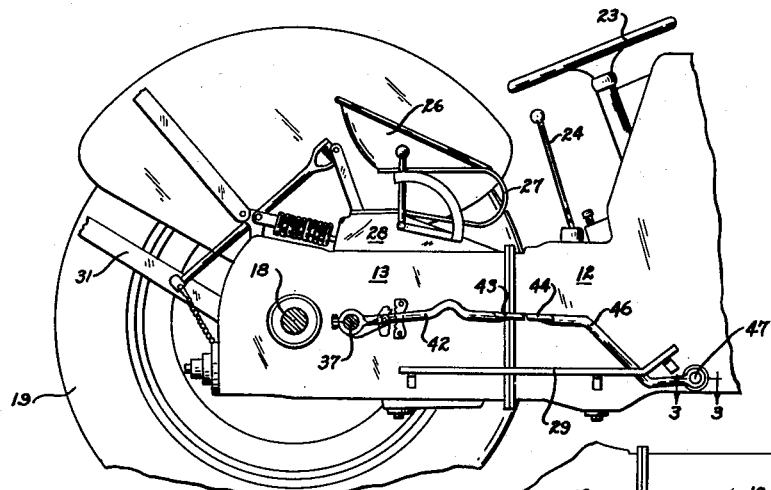
Fig. 2
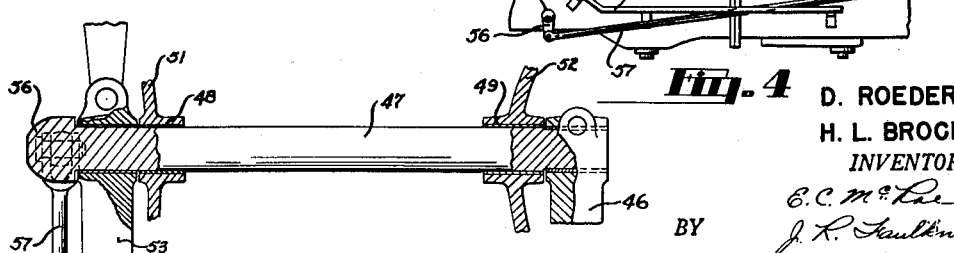
Fig. 3
Fig. 4
D. ROEDER
H. L. BROCK
INVENTORS.
BY
ATTORNEYS.

Patented Feb. 6, 1951

2,540,458

UNITED STATES PATENT OFFICE 2,540,458

TRACTOR CONTROL PEDAL ARRANGEMENT

Dale Roeder and Harold L. Brock, Detroit, Mich., assignors to Ford Motor Company, Dearborn, Mich., a corporation of Delaware Application September 19, 1947, Serial No. 775,085

7 Claims. (Cl. 180—77)

This invention relates generally to tractors, and has particular reference to a brake system for a tractor.

Tractors conventionally have friction brakes on the rear driving wheels and frequently these brakes are individually operated by separate foot pedals, the foot pedal for actuating the brake on the right rear wheel being on the right side of the tractor chassis for engagement by the driver's right foot, and the brake pedal for operating the brake on the left rear wheel being on the left side of the chassis for operation by the left foot of the driver. Arranging the brakes for separate operation enables the brakes to be used not only for stopping but also to facilitate in turning the tractor. A much sharper turn can be made by applying the brake on one side of the tractor to retard or bring to a complete stop the corresponding driving wheel so that a turn can be made with the smallest possible radius. This is important in many tractor operations, as, for example, when the end of a furrow is reached in plowing and it is desired to make as sharp a turn as possible.

The conventional arrangement of placing one brake pedal on each side of the tractor chassis is accompanied by several attendant disadvantages. For example, it is difficult to equalize the braking action between opposite sides of the tractor when bringing the tractor to a stop. It is furthermore usually extremely difficult to make a sharp turn in one direction, since when turning toward the side on which the clutch pedal is mounted it is necessary for the driver to operate both the clutch pedal and one of the brake pedals with the same foot. In making a sharp turn at the end of a furrow it is quite frequently necessary to throw out the clutch, either to prevent stalling of the engine or to slow down the tractor and prevent overrunning the field, and since this clutch operation must occur simultaneous with the operation of the brake pedal on that side, it is quite impossible for the driver to satisfactorily control each with one foot.

It is accordingly a primary object of the present invention to overcome the above-mentioned and other disadvantages of the usual arrangement by providing a tractor having independently operable friction brakes for each of the rear wheels and a separate foot pedal for each of the brakes, with both of the foot pedals located on the same side of the tractor for engagement by one of the driver's feet, while the clutch pedal is located on the opposite side of the tractor for operation by the driver's other foot. It is a further object of the invention to so arrange the brake pedals that they may be operated naturally by the driver and so that he may shift his foot readily from one to the other or, in the case of applying both brakes to stop the tractor, may readily apply both with the same foot. This is accomplished by arranging the pedals generally on an arc whose center is approximately on the longitudinal center line of the tractor and in the zone of the rear portion of the driver's seat. This makes the operation of shifting his foot from one pedal to the other a natural one and not only eliminates driver fatigue but also provides greater safety of operation by facilitating the proper and positive control of the brakes. This arrangement also makes it possible to apply both brake pedals with one foot in such a manner as to equalize the pressure upon the pedals.

Still another object of the present invention is to provide a brake system for a tractor utilizing separate foot pedals for the brake on each of the rear wheels with the foot pedals arranged on one side of the tractor chassis in such a manner that the mounting for the foot pedals and the connections between the pedals and the brakes are simplified and inexpensive to manufacture. This construction includes a rock shaft mounted forwardly of the driver's position and extending transversely of the tractor, one of the brake foot pedals being mounted on one end of the rock shaft, and linkage from the brake on the other side of the tractor being connected to the opposite end of the rock shaft. Furthermore, this shaft forms a dual function by providing a journal for the clutch pedal.

These and other objects of the invention will be made more apparent as this description proceeds, particularly when considered in connection with the accompanying drawings, in which:

Figure 1 is a plan view of a tractor embodying the present invention.

Figure 2 is a fragmentary side elevational view of the tractor shown in Figure 1, with the right rear wheel removed to more clearly illustrate portions of the brake system.

Figure 3 is an enlarged transverse cross sectional view taken substantially on the plane indicated on the line 3—3 of Figure 2.

Figure 4 is a fragmentary side elevational view of the left side of the tractor showing the brake linkage.

Referring now more particularly to the drawings, there is shown a farm tractor having an engine unit 11, a transmission unit 12, and a rear axle unit 13, suitably secured together to form a frameless chassis. A front axle 14 carries front road wheels 16 and 17, while the rear axle 18 extending from the rear axle unit 13 supports the driven rear road wheels 19 and 21.

The tractor also conventionally includes a steering wheel 23 and a gearshift lever 24 mounted upon the transmission unit 12. The driver's seat 26 is carried upon a U-shaped spring 27 which in turn is mounted upon a cover 28 secured to the upper portion of the rear axle unit 13. Suitable running boards 29 are provided on opposite sides of the chassis for the convenience of the driver. Linkage 31 extending from the rearward portion of the tractor provides means for the attachment of the various implements used in farming operations.

Each of the rear road wheels 19 and 21 is provided with an independently operable friction brake. The brakes for the two wheels are identical, and are of conventional construction. Referring to Figure 1, each brake includes a brake drum 32 rotatable with the wheel, and a stationary brake backing plate 33 which supports a pair of brake shoes 34. The brake shoes are adapted to be expanded into frictional engagement with the drum by means of a rotatable cam 36 carried at the outer end of a brake operating shaft 37. The brake operating shaft 37 is transversely arranged and is rotatably mounted in journals 38 and 39 supported respectively upon the rear axle unit 13 and the brake backing plate 33. The brake mechanism for the left rear road wheel 19 has a similar brake operating shaft 41 on the opposite side of the tractor chassis. The two shafts 37 and 41 are entirely independent of each other.

An operating lever 42 is clamped at its rearward extremity to the brake operating shaft 37 and extends longitudinally forwardly therefrom. At its forward end the lever 42 is bent inwardly toward the chassis and carries a foot pedal 43 which is shown as being integrally formed with the lever but which may, if desired, be separate therefrom and suitably secured thereto. It will be noted that the foot pedal 43 is located vertically above the running board 29 and is adjacent the driver's seat 26, being arranged at a convenient angle with respect thereto for operation by the driver.

Spaced slightly inwardly and forwardly of the brake pedal 43 for the right rear brake is a second brake pedal 44 also angularly arranged with respect to the tractor chassis. The brake pedal 44 is integrally formed at the rearward extremity of an operating lever 46, which extends longitudinally forwardly therefrom and is clamped at its forward extremity to the transversely mounted rock shaft 47. As best seen in Figure 3, the rock shaft 47 is journaled in bearings 48 and 49 provided in the opposite side walls 51 and 52 respectively of the transmission unit 12.

The rock shaft 47 extends outwardly beyond the left side wall 51 of the transmission unit and forms a journal for the clutch operating lever 53, which is conventionally connected to the clutch mechanism (not shown) and carries a clutch pedal 54 conveniently arranged for operation by the left foot of the driver. It will be noted that the clutch pedal 54 is angularly arranged with respect to the tractor chassis in a manner similar to the arrangement of the brake pedal 44 on the opposite side of the chassis.

An integral depending arm 56 is carried at the outer end of the rock shaft 47, and is connected by a link 57 to a crank arm 58 mounted upon the brake operating shaft 41 for the left rear brake.

From the foregoing it will be seen that depression of the brake pedal 44 is effective through the brake lever 46, rock shaft 47, arm 58, link 57 and arm 56 to rotate the brake operating shaft 41 and apply the left rear brake. The adjacent foot pedal 43 is, of course, directly connected by the lever 42 to the brake operating shaft 37 for the right rear brake. It will be noted that with this arrangement the clutch pedal 54 is located on the left side of the chassis for engagement by the driver's left foot, while the brake pedals 43 and 44 for the right and left rear brakes respectively are located on the right side of the tractor chassis for engagement by the driver's right foot. This arrangement is extremely efficient both when the brakes are being used to stop the tractor as well as when they are being used separately to assist in steering and in making sharp turns. Referring to Figure 1, it will be seen that both of the brake pedals 43 and 44 as well as the clutch pedal 54, are arranged approximately on a common arc about a center 59 located in vertical alignment with the rearward portion of the driver's seat 26 and substantially on the longitudinal center line of the tractor. Referring to Figure 1, it will be seen that the brake pedals 43 and 44 are elongated as viewed in plan, and extend angularly with respect to the longitudinal center line of the tractor at acute angles thereto. It has been found that an arrangement of this character is most satisfactory and is not only convenient from the driver's standpoint but also promotes faster stopping, shorter turning and more positive control of the brakes and clutch.

When the brakes are used to stop the tractor, the driver operates both brakes simultaneously by placing his right foot in a position overlapping the adjacent ends of the brake pedals 43 and 44, this being possible by the above-described arrangement of the pedals. Not only is he thus able to apply pressure simultaneously to both of the brake pedals, but the natural pivotal action of his foot and ankle automatically results in equalizing the brake action between the two pedals so that equalized operation of the right and left rear brakes is obtained. Furthermore, if for any reason it is desired to apply greater pressure to one or the other of the brake pedals, this can very easily be done from this position.

When the brakes are being individually applied to assist in steering the vehicle and to make possible turns of shorter radius than can be obtained by using the steering mechanism alone, the driver controls the clutch pedal 54 with his left foot and the desired brake pedal with his right foot. For example, when the end of a furrow is reached in plowing, it is necessary to make a precisely controlled sharp turn. At the same time it is often essential that the clutch be simultaneously operated to prevent stalling of the engine or to disengage the engine to prevent overrunning the field. In the conventional arrangement, with the left brake pedal located on the left side of the tractor adjacent the clutch pedal, it is extremely difficult to properly make a sharp left turn since the driver must control both the clutch and the brake pedal with one foot, a feat which cannot be done with ease or with the degree of control necessary. With applicants' arrangement, however, whether making a left turn or a right turn, the driver may use his right foot to control the particular brake while the clutch is operated by his left foot, and the sharp turn may be executed with the tractor under an accurate positive control at all times. If, when using one brake to assist in making a turn, it is then necessary to apply both brakes to some extent to slow down the tractor speed, it is a simple matter for the driver to shift his right foot from the one brake pedal to a position straddling both pedals so that he can apply both brakes in whatever proportion he desires. The arrangement of the brake pedals on a common arc selected for the maximum convenience and ease of operation permits such maneuvering with a minimum of lost time and control.

From the foregoing it will be seen that the arrangement of the present invention is extremely advantageous in that it eliminates driver fatigue and enables the brake and clutch to be accurately controlled and operated under all conditions in a minimum of time, thus effecting a safer and more efficient operation of the tractor during farming operations.

Although we have shown and described certain embodiments of the invention, it will be understood that we do not wish to be limited to the exact construction shown and described, but that various changes and modifications may be made without departing from the spirit and scope of our invention, as defined in the appended claims.

What is claimed is:

1. In a tractor having a chassis supporting a driver's seat and front and rear road wheels on opposite sides of said chassis, independently operable brakes for each of said rear road wheels, and a pair of foot pedals each arranged to actuate one of said brakes, said foot pedals being arranged adjacent each other on the same side of said chassis and disposed substantially along the arc of a circle whose center is located in vertical alignment with the rearward portion of said driver's seat and whose radius is only slightly greater than the distance from said center to the forward edge of said seat.

2. In a tractor having a chassis supporting a driver's seat and front and rear road wheels on opposite sides of said chassis, independently operable friction brakes for each of said rear road wheels, actuating means for each of said brakes, and a pair of foot pedals movable substantially vertically to control said actuating devices respectively, said foot pedals being located on the same side of the tractor chassis in substantially the same horizontal plane and lying generally along the arc of a circle whose center is located in vertical alignment with the rearward portion of said driver's seat and substantially along the longitudinal center line of said chassis and whose radius is only slightly greater than the distance from said center to the forward edge of said seat.

3. In a tractor having a chassis supporting a driver's seat and right and left rear road wheels on opposite sides of said chassis, friction brakes associated with each of said rear road wheels to selectively retard the latter, a pair of foot pedals located on the same side of said chassis and mounted for pivotal movement about longitudinally spaced axes, one of said axes being located rearwardly of said foot pedals and the other being located forwardly thereof, said foot pedals being arranged in transversely spaced relationship for either individual or simultaneous operation and each being located at an acute angle to the longitudinal axis of said chassis, and means operatively connecting each of said foot pedals to one of said brakes to control the operation of the latter.

4. In a tractor having a chassis supporting a driver's seat and front and rear road wheels on opposite sides of said chassis, friction brakes for each of said rear road wheels, a transversely arranged camshaft adjacent each of said rear road wheels, cam means mounted upon each of said camshafts and engageable with the friction brake for the adjacent road wheel to apply the latter upon rotation of said shaft, a rock shaft rotatably mounted upon said tractor chassis forwardly of said driver's seat, a pair of foot pedals located on the same side of said chassis, one of said foot pedals being directly connected to the camshaft on the same side of said chassis and the other of said foot pedals being mounted upon said rock shaft adjacent one end thereof, linkage interconnecting the opposite end of said rock shaft to the camshaft on that side of said chassis, and a clutch pedal rotatably journaled on said last-mentioned end of said rock shaft.

5. The structure defined by claim 4 which is further characterized in that the foot engaging portions of each of said two brake foot pedals are located substantially in the same horizontal plane and are arranged in end-to-end relationship with a small clearance therebetween so as to facilitate either individual operation or simultaneous operation by the driver's foot, said foot-engaging portions also being arranged at an acute angle to the longitudinal center line of the tractor.

6. In a tractor having a chassis supporting a driver's seat, an engine and a clutch mounted upon said chassis, and front and rear road wheels on opposite sides of said chassis, friction brakes for each of said rear road wheels, a separate foot pedal for each of said brakes operatively connected to said brakes respectively to apply the latter upon depression of said pedals, both of said pedals being located on the same side of said chassis, and a clutch pedal arranged to operate said clutch and located on the opposite side of said tractor chassis from said two brake foot pedals, said pedals all being movable substantially vertically to control said brakes and said clutch and being located substantially in vertical alignment with the outer extremities of said seat and a substantial distance therebelow, said two brake pedals and said clutch pedal being arranged substantially along the arc of a circle whose center is in vertical alignment with the rearward portion of said seat and substantially on the longitudinal center line of said chassis.

7. In a tractor having a chassis supporting a driver's seat and front and rear road wheels on opposite sides of said chassis, friction brakes for each of said rear road wheels, separate actuating means for each of said brakes, a rock shaft extending transversely of said tractor rearwardly of said driver's seat and operatively connected to the actuating means for the brakes for one of said road wheels, an arm extending forwardly from said rock shaft on one side of said driver's seat, a brake pedal mounted upon said arm at its forward end, a second rock shaft extending transversely of said tractor forwardly of said driver's seat, means operatively connecting said second rock shaft to the actuating means for the brake for the other of said rear road wheels, an arm extending rearwardly from said second rock shaft on the same side of said driver's seat as said first arm, a brake pedal mounted upon said second arm at its rearward end immediately adjacent the brake pedal mounted on said first arm, and a clutch pedal rotatably journaled on said second rock shaft on the opposite side of said driver's seat from said brake pedals.

DALE ROEDER.
HAROLD L. BROCK.

REFERENCES CITED

The following references are of record in the file of this patent:

UNITED STATES PATENTS

| Number | Name | Date |
|---|---|---|
| 1,050,686 | Pelton | Jan. 14, 1913 |
| 2,067,546 | Rocher | Jan. 12, 1937 |
| 2,340,134 | Maxon et al. | Jan. 25, 1944 |

FOREIGN PATENTS

| Number | Country | Date |
|---|---|---|
| 31,392 | Switzerland | June 14, 1904 |